(12) United States Patent
Savir et al.

(10) Patent No.: US 11,854,102 B2
(45) Date of Patent: Dec. 26, 2023

(54) EVALUATING SOFTWARE LICENSE USAGE USING REINFORCEMENT LEARNING AGENTS

(71) Applicant: EMC IP Holding Company LLC, Hopkinton, MA (US)

(72) Inventors: Amihai Savir, Sansana (IL); Assaf Natanzon, Tel Aviv (IL); Shiri Gaber, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 137 days.

(21) Appl. No.: 16/401,610

(22) Filed: May 2, 2019

(65) Prior Publication Data
US 2020/0349662 A1 Nov. 5, 2020

(51) Int. Cl.
*G06Q 10/00* (2023.01)
*G06Q 50/18* (2012.01)
*G06N 20/00* (2019.01)
*G06Q 10/0639* (2023.01)
*G06F 11/34* (2006.01)
(Continued)

(52) U.S. Cl.
CPC .......... *G06Q 50/184* (2013.01); *G06F 11/34* (2013.01); *G06F 11/3409* (2013.01); *G06F 11/3423* (2013.01); *G06F 11/3452* (2013.01); *G06F 11/3466* (2013.01); *G06N 20/00* (2019.01);
(Continued)

(58) Field of Classification Search
CPC .......... H04L 67/22; H04L 67/143–145; G06Q 50/184; G06F 11/34–3466
See application file for complete search history.

(56) References Cited

U.S. PATENT DOCUMENTS 6,938,027 B1   8/2005  Barritz et al.
10,051,019 B1 * 8/2018  Jasso ................. G06F 16/00
(Continued)

OTHER PUBLICATIONS

Floating Software Licensing 2.0—Virtual Machines & Cloud Computing, Mar. 23, 2010, Cris Wendt @getrevenera,https://www.revenera.com/blog/software-monetization/floating-software-licensing-20-virtual-machines-cloud-computing/ (Year: 2010).*
(Continued)

*Primary Examiner* — Rutao Wu
*Assistant Examiner* — Scott M Ross
(74) *Attorney, Agent, or Firm* — Ryan, Mason & Lewis, LLP

(57) ABSTRACT

Techniques are provided for reinforcement learning-based evaluation of software product usage. One method comprises obtaining key performance indicators indicating software product usage by a user; determining, for a predefined time window: (i) a mean and/or a median of the obtained KPIs; (ii) an amount of time that the software product was active; and (iii) an amount of interactions by the user with a user interface; evaluating possible login states of the software product using at least one reinforcement learning agent, wherein the evaluating comprises (a) observing the plurality of possible login states, including a current state comprising a current login state of the software product, and (b) obtaining an expected utility score for changing from the current login state to a different login state of the software product; and determining whether to change from the current login state to a different login state of the software product based on the expected utility score.

20 Claims, 3 Drawing Sheets

MULTIPLE KEY PERFORMANCE INDICATORS 110 INDICATING USAGE OF SOFTWARE → REINFORCEMENT LEARNING MODULE 100 AGENT 130 TRAVERSES SET OF STATES S AND SET OF ACTIONS A PER STATE → SELECTED ACTION(S) 150: TERMINATE SESSION/ MAINTAIN SESSION/ PROMPT INACTIVE USER

↑

SOFTWARE USAGE VARIABLE(S) 120 (e.g., TIME SOFTWARE PRODUCT WAS ACTIVE ON DISPLAY AND USER INTERFACE INTERACTIONS IN PREDEFINED TIME WINDOW)

(51) Int. Cl.
*H04L 67/143* (2022.01)
*H04L 67/50* (2022.01)
(52) U.S. Cl.
CPC ..... *G06Q 10/06393* (2013.01); *H04L 67/143* (2013.01); *H04L 67/535* (2022.05)

(56) References Cited

U.S. PATENT DOCUMENTS

| | | | |
|---|---|---|---|
| 11,249,798 B1* | 2/2022 | Sadacharam | G06F 9/485 |
| 2002/0107809 A1 | 8/2002 | Biddie | |
| 2005/0049973 A1* | 3/2005 | Read | G06F 21/10 705/59 |
| 2006/0059556 A1* | 3/2006 | Royer | G06F 9/485 726/22 |
| 2007/0233943 A1* | 10/2007 | Teh | G06F 12/0215 711/105 |
| 2008/0005381 A1* | 1/2008 | Theocharous | G06F 1/3203 710/18 |
| 2009/0031286 A1* | 1/2009 | Yee | G06Q 10/06 717/120 |
| 2010/0306392 A1* | 12/2010 | Fell, Jr. | H04L 69/28 709/228 |
| 2014/0052610 A1 | 2/2014 | Aggarwal et al. | |
| 2015/0081876 A1* | 3/2015 | Pieczul | H04L 67/22 709/224 |
| 2015/0350338 A1* | 12/2015 | Barnett | H04L 67/22 709/203 |
| 2016/0004567 A1 | 1/2016 | Michel et al. | |
| 2016/0142511 A1 | 5/2016 | Smith et al. | |
| 2016/0253641 A1 | 9/2016 | Smith et al. | |
| 2017/0004436 A1* | 1/2017 | Bastide | G08B 21/182 |
| 2017/0177063 A1* | 6/2017 | Ederbach | G06F 1/3231 |
| 2017/0353565 A1* | 12/2017 | Kumar | H04L 67/125 |
| 2017/0374073 A1* | 12/2017 | Schoppmeier | H04L 9/08 |
| 2018/0107962 A1* | 4/2018 | Lundin | G06N 20/00 |
| 2018/0206191 A1* | 7/2018 | Fiennes | H04W 52/0229 |
| 2018/0321927 A1 | 11/2018 | Borthakur | |
| 2019/0286215 A1* | 9/2019 | Paul | F24F 11/62 |
| 2019/0318064 A1 | 10/2019 | Paladino et al. | |
| 2020/0078688 A1* | 3/2020 | Kaethler | A63F 13/67 |
| 2020/0167444 A1 | 5/2020 | Singri et al. | |
| 2021/0390002 A1* | 12/2021 | Shah | G06F 9/5072 |

OTHER PUBLICATIONS

Licensing 101—Altium License Types and Functions; Jan. 27, 2021 https://resources.altium.com/p/licensing-101-altium-license-types-and-functions: (Year: 2021).*
"Training a Neural Network with Reinforcement Learning" ; By Saturn Cloud | Thursday, Jul. 6, 2023 (Year: 2023).*
U.S. Appl. No. 16/145,536 entitled, "System Operational Analytics Using Normalized Likelihood Scores", filed Sep. 28, 2018.
U.S. Appl. No. 16/173,291 entitled, "Identifying Anomalies in User Internet of Things Activity Profile Using Analytic Engine", filed Oct. 29, 2018.
U.S. Appl. No. 16/431,941 entitled, "Dynamic Optimization of Software License Allocation Using Machine Learning-Based User Clustering", filed Jun. 5, 2019.
U.S. Appl. No. 15/961,035 entitled, "Deep Reinforcement Learning for Workflow Optimization Using Provenance-Based Simulation", filed Apr. 24, 2018.

* cited by examiner

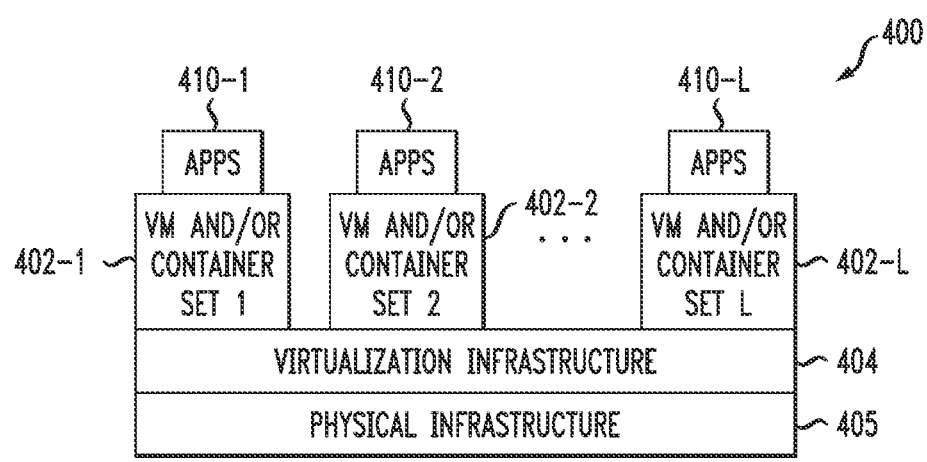
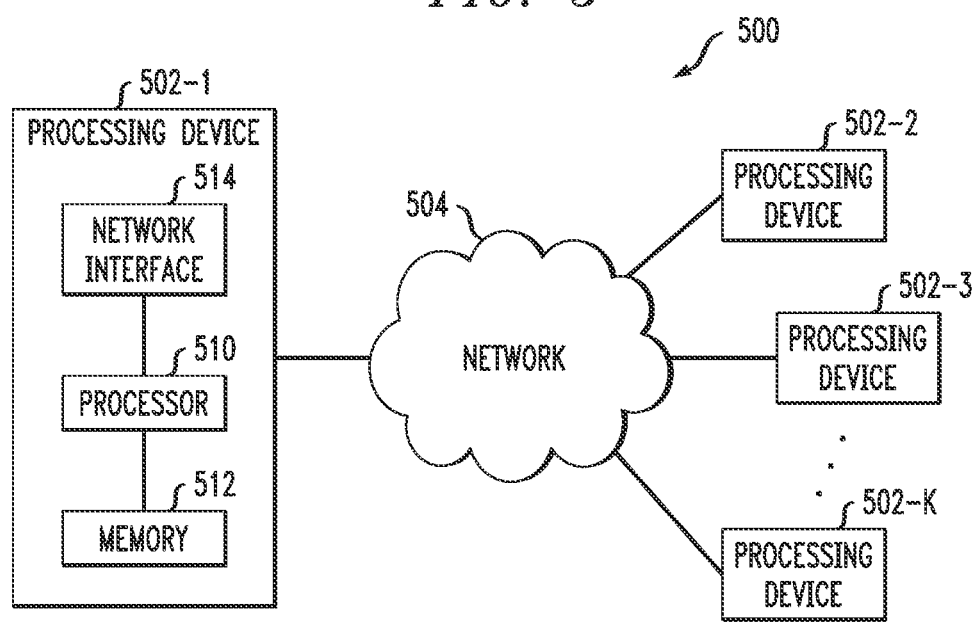

EVALUATING SOFTWARE LICENSE USAGE USING REINFORCEMENT LEARNING AGENTS

FIELD

The field relates generally to the evaluation of software product usage.

BACKGROUND

Many software products, such as the Matlab® computing environment and programming language, commercially available from The MathWorks, Inc., use a hybrid license model where you can buy a first type of license, often referred to as a permanent software license, for a single user at one price, or a second type of license for multiple users (but typically only a single user at one time), often referred to as a floating or a flexible software license, typically at a significantly higher cost. It is often challenging for an organization to determine an appropriate number of licenses to acquire of each license type in order to maximize productivity with respect to the particular software product, while also minimizing costs. Determining the appropriate number of each license type is often based on the amount of time that each user spends using the software. If a particular user uses the software more than 20% of his or her work hours, for example, then a permanent software license may be best.

Among other challenges, it is often difficult to determine when the license is in use, as users may remain logged-into the software product without actually using the software. A need therefore exists for software license usage techniques that leverage reinforcement learning to understand when a user is actually using a particular software product and when the user can be automatically logged out of the software product. In this manner, more reliable estimations are obtained regarding the number of floating licenses that are needed.

SUMMARY

In one embodiment, a method comprises obtaining a plurality of key performance indicators indicating usage by a user of a software product; determining, for a predefined time window: (i) one or more of a mean and a median of one or more of the obtained key performance indicators; (ii) an amount of time that the software product was active on a display of the user; and (iii) an amount of interactions by the user with a user interface; evaluating a plurality of possible login states of the software product using at least one reinforcement learning agent, wherein the evaluating comprises (a) observing the plurality of possible login states, including a current state comprising a current login state of the software product, and (b) obtaining an expected utility score for changing from the current login state of the software product to a different login state of the software product; and determining whether to change from the current login state of the software product to a different login state of the software product based on the expected utility score.

In some embodiments, the possible login states of the software product comprise a logged-in state, a logged-out state, and a state in which a potentially inactive user is prompted before logging out the potentially inactive user. In at least one embodiment, the exemplary method further comprises a selection between a permanent user license and a floating user license for one or more users based on the evaluating.

Other illustrative embodiments include, without limitation, apparatus, systems, methods and computer program products comprising processor-readable storage media.

BRIEF DESCRIPTION OF THE DRAWINGS

FIG. 4 illustrates an exemplary processing platform that may be used to implement at least a portion of one or more embodiments of the disclosure comprising a cloud infrastructure; and FIG. 5 illustrates another exemplary processing platform that may be used to implement at least a portion of one or more embodiments of the disclosure.

DETAILED DESCRIPTION

Figure 1:
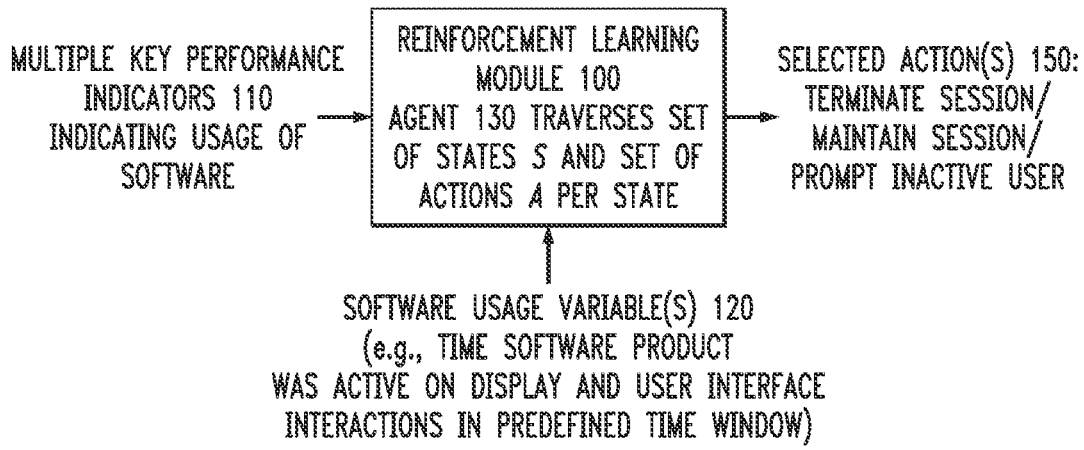
FIG. 1 illustrates an exemplary reinforcement learning module for software usage evaluation, according to an embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for reinforcement learning-based evaluation of software product usage.

In one or more embodiments, multiple possible login states of a given software product are evaluated using at least one reinforcement learning agent, to determine whether to change from a current login state of the software product to a different login state, for example, based on an expected utility score. The reinforcement learning agent can be updated, for example, by obtaining feedback from the user indicating whether a given change from the current login state to the different login state of the software product was a correct action.

Among other benefits, the disclosed reinforcement learning-based evaluation of software product usage allows an organization to better select between permanent user licenses and floating user licenses for the user and additional users in the organization.

In reinforcement learning, a software agent makes observations and takes actions within an environment, and in return the software agent receives rewards. The algorithm used by the software agent to determine its actions is often referred to as the policy of the software agent. For example, the policy could be a neural network taking observations as inputs and outputting the action to take, as discussed further below.

In some embodiments, reinforcement learning (RL) agents are employed to balance between the exploration of new software license usage configurations and the exploitation of known software license usage configurations. One or more embodiments of the present disclosure enable and enhance an application of RL in the context of software license usage.

The objective of the software agent, in one or more exemplary embodiments, is to learn to act in a way that will substantially maximize the expected long-term rewards (rewards can be positive or negative (negative rewards are also referred to as a penalty)). In short, the RL agent acts in the environment and learns by trial and error to maximize its pleasure and minimize its pain.

Consider an exemplary policy where the action is automatically logging a user out of a licensed software product (e.g., disconnecting the user), and the reward is the number of floating licenses that can be returned to the pool. One policy could be disconnecting a user that is connected to the session with some probability p, or maintaining the user connection with probability of 1−p. The penalty for reconnection of a user that was recently disconnected by the policy can be expressed, for example, as r−. In some embodiments, the exemplary policy considers the feedback, as well as the observations of the user and session details (for example, the resource utilization of the software process (e.g., processing resources, memory resources, input/output operation resources, and graphics processing resources) the session time, user role and properties.

One or more embodiments recognize that there is a need to optimize the respective number of flexible software licenses and single user (permanent) software licenses. As noted above, many users tend to stay logged-in to a given software product, even when not actually using the software. Thus, deciding whether a permanent license for a given user is appropriate is significantly more difficult.

For a more detailed discussion of reinforcement learning, see, for example, the Reinforcement Learning page on scholarpedia.org; and/or Richard S. Sutton and Andrew G. Barto, Reinforcement Learning: An Introduction, The MIT Press Cambridge, Mass. (2014, 2015), each incorporated by reference herein in its entirety If the RL agent generates, with high confidence, a prediction that a given user is not using the software product, the user can optionally be automatically logged out from the software product. The user may, however, complain that a given logout event was a mistake. In order to reduce the disturbance to users, the number of logout actions can be monitored, controlled, and/or minimized, for example, using feedback techniques.

In some embodiments, a given users can be periodically probed when the RL agent suspects that the user is not using the software product, and optionally prompt the user before logging the user out from the software product. For example, the feedback from the user can be processed by the RL agent, as well as one or more monitored key performance indicators (KPIs), to understand user behavior, for each user, and also globally across users of an organization, for example, in order to improve the prediction of when the software product is being used.

As discussed further below, the RL agent employs an algorithm that optionally assigns each user to a single user (permanent) license or a floating license, such that the price of licenses is minimal (this is a type of scheduling problem, there are many approximation algorithms that can give good solutions (since the problem is NP-HARD), such as a policy search by a neural network, (policy gradients) or Markov decision process, and overall the amount of licenses can be minimized).

FIG. 1 illustrates an exemplary reinforcement learning module 100 for software usage evaluation, according to an embodiment of the disclosure. The exemplary reinforcement learning module 100 comprises one or more RL agents 130 that traverse a set of states S and a set of actions A per state.

The system state is given by the telemetry metrics of the machines executing the software product(s) under consideration and, optionally, the execution state of each of the software product(s) under consideration at each instant. In a cloud environment, for example, the system state comprises the set of telemetry metrics collected from all the machines running the software product(s) under consideration. The system state, comprising multiple KPIs 110 indicating usage of the software product, together with a number of software usage variables 120, are assumed to contain the information required to determine the next state (e.g., based on a determination of whether the user is using the software).

In one or more embodiments, the collected KPIs 110 include, for example, a resource usage (e.g., central processing unit (CPU), graphics processing unit (GPU), memory, input/output, and network resources) for a given application The exemplary software usage variables 120 generally indicate usage of the software product and comprise, for example, an amount of time the monitored software product was active on a user display, and user interface interactions (e.g., mouse and keyboard clicks and, optionally, the content of user interface interactions) in a predefined time window. In addition, login and logout times of the users can also be collected in some embodiments.

In one or more embodiments, the RL agent 130 processes one or more of the collected KPIs 110, as follows:
- every minute (or another time interval), calculate the mean and median for each KPI 110 in the predefined time window of [t−x, t], where x is a parameter that the user can define or can be learned;
- the collected KPIs 110 can be applied to the RL agent 130, for example, as an input vector, and the RL agent 130 will learn (or be configured with) an appropriate threshold against each KPI;
- the RL agent 130 determines an amount of time that the application window for the monitored software product was active on the screen of the user in the predefined time window of [t−x, t]; and
- the RL agent 130 determines an amount of user interface interactions (e.g., mouse clicks and keyboard activity) in the predefined time window of [t−x, t].

At each state, the RL agent 130 can perform actions that affect the computing environment where the software product executes and that impact the immediate cost and the transition towards the next state. In the exemplary setup, the available actions 150 comprise, for example, terminating a user session, maintaining a user session, and prompting an inactive user about whether the session should be terminated. The RL agent 130 is in charge of determining, at each decision opportunity, whether to maintain the current system configuration or to act towards a change in the session status.

As noted above, the exemplary RL agent 130 may employ an exemplary policy where the action is automatically logging a user out of a licensed software product (e.g., disconnecting the user), when deemed appropriate, and the corresponding reward is the number of floating licenses that can be returned to the pool.

For example, if the exemplary RL agent 130 determines that a given session is not currently active (e.g., according to a set of thresholds over the monitored KPIs 110) for a predefined time period, the exemplary RL agent 130 may automatically terminate the user session with the monitored software product. Otherwise, the exemplary RL agent 130 will maintain the user session with the monitored software product.

In further embodiments, the rewards for the actions of the RL agent 130 may include, for example, a reward if the user did not reconnect to the session within a configurable time duration after automatically being logged out by the RL agent 130. The weight of the reward can be related, for example, to the demand for licenses from the floating license pool. In addition, if the user reconnected or otherwise gave negative feedback after automatically being logged out by the RL agent 130, a negative reward will be generated according to the user role properties and the RL agent 130 can optionally be updated to reflect the negative feedback.

Figure 2:
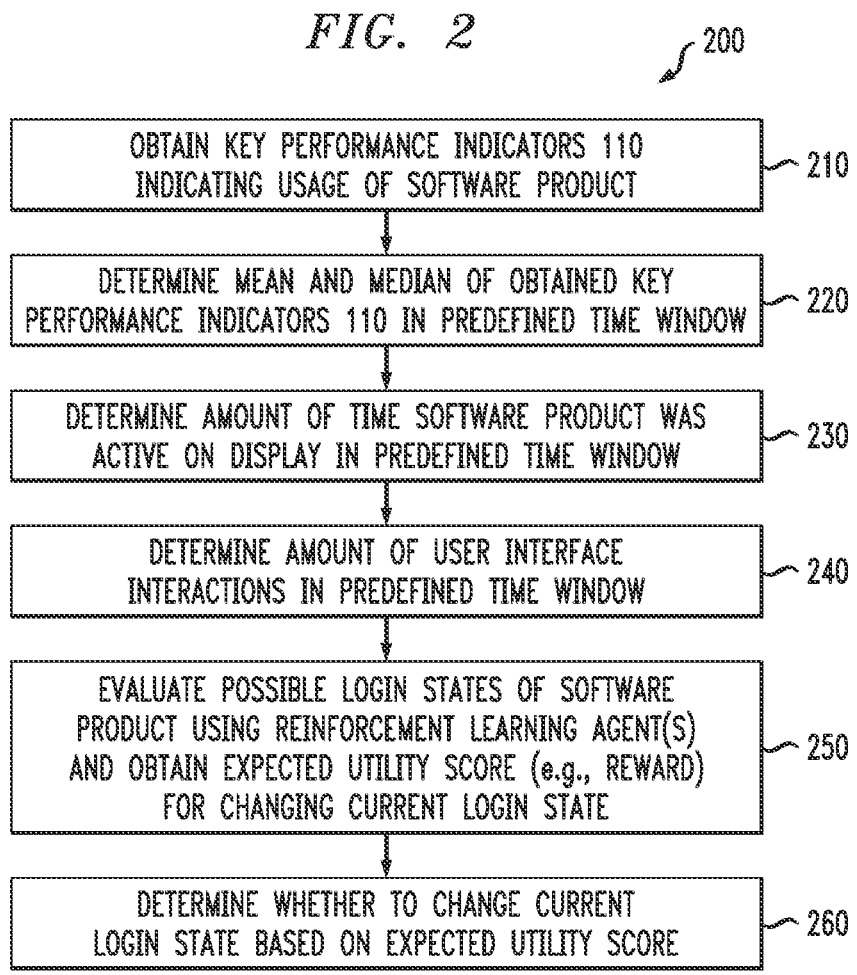
FIG. 2 is a flow chart illustrating an exemplary implementation of a reinforcement learning-based process for evaluating software product usage, according to one embodiment.

FIG. 2 is a flow chart illustrating an exemplary implementation of a reinforcement learning-based process 200 for evaluating software product usage, according to one embodiment of the disclosure. As shown in FIG. 2, the exemplary reinforcement learning-based process 200 initially obtains key performance indicators 110 during step 210 indicating usage by a user of a monitored software product. In addition, the exemplary reinforcement learning-based process 200 determines: a mean and a median of the obtained key performance indicators 110 during step 220; an amount of time that the software product was active on a display of the user during step 230; and an amount of interactions by the user with a user interface during step 240, all for the same predefined time window.

During step 250, the exemplary reinforcement learning-based process 200 evaluates possible login states of the software product using at least one reinforcement learning agent 130. In some embodiments, the evaluating during step 250 comprises (i) observing the plurality of possible login states, including a current state comprising a current login state of the software product, and (ii) obtaining an expected utility score for changing from the current login state of the software product to a different login state of the software product.

Finally, the reinforcement learning-based process 200 of FIG. 2 determines whether to change from the current login state of the software product to a different login state of the software product based on the expected utility score during step 260.

Figure 3:
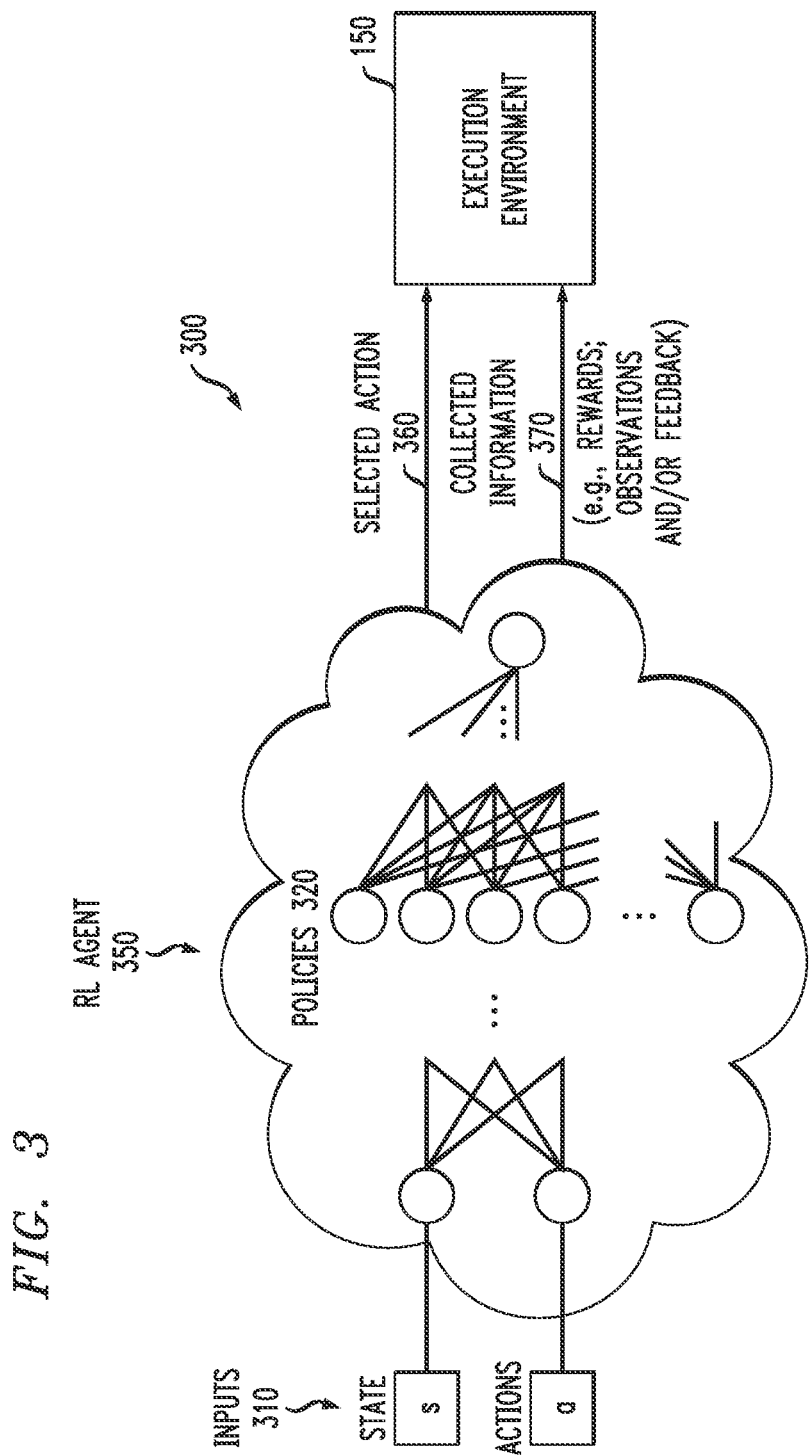
FIG. 3 illustrates an exemplary reinforcement learning-based environment for evaluating software product usage, according to some embodiments of the disclosure.

In some embodiments, the particular processing operations and other network functionality described in conjunction with the flow diagram of FIG. 3 are presented by way of illustrative example only, and should not be construed as limiting the scope of the disclosure in any way. Alternative embodiments can use other types of processing operations to evaluate a user's interaction with a monitored software product in order to make a decision about whether to automatically log out the user session. For example, the ordering of the process steps may be varied in other embodiments, or certain steps may be performed concurrently with one another rather than serially.

FIG. 3 illustrates an exemplary reinforcement learning-based environment 300 for evaluating software product usage, according to some embodiments. As discussed above in conjunction with FIG. 1, an exemplary RL agent 350 performs a software usage evaluation by traversing inputs 310 comprising a set of states s and a set of actions a per state. The system state is given, for example, by the telemetry metrics of the machines executing the software product(s) under consideration and, optionally, the execution state of each of the software product(s) under consideration at each instant. The system state, comprising multiple KPIs 110 (FIG. 1) indicating usage of the software product, together with a number of software usage variables 120 (FIG. 1), are assumed to contain the information required to determine the next state (e.g., based on a determination of whether the user is using the software).

The exemplary RL agent 350 may employ one or more exemplary policies 320, where the selected actions 360 comprise, for example, one of terminating a user session in the execution environment (e.g., automatically logging a user out of a licensed software product (e.g., disconnecting the user)), maintaining a user session, or prompting an inactive user about whether the session should be terminated. one or more exemplary policies 320 could be implemented as a neural network taking observations as inputs and outputting the action(s) to take.

If the exemplary RL agent 350 determines that a given session is not currently active (e.g., according to a set of thresholds over the monitored KPIs 110) for a predefined time period, the exemplary RL agent 350 may automatically terminate the user session with the monitored software product. Otherwise, the exemplary RL agent 350 will maintain the user session with the monitored software product.

In addition, as noted above, the RL agent 350 also collects collected information 370, comprising, for example, rewards, observations and/or feedback, from the execution environment. In some embodiments, the corresponding reward is the number of floating licenses that can be returned to the pool, or potentially a reduced license fee based on the reduced time that the monitored software product was being used.

Among other benefits, the disclosed techniques for reinforcement learning-based evaluation of software product usage learn and optimize the understanding of when a given software license is being used (or not being used). In addition, based on this knowledge, one or more inactive users can automatically be logged off of the monitored software products, and the appropriate balance can be achieved across all users between permanent (single user) software licenses and flexibles (multiple user) software licenses.

One or more embodiments of the disclosure provide improved methods, apparatus and computer program products for reinforcement learning-based evaluation of software product usage. The foregoing applications and associated embodiments should be considered as illustrative only, and numerous other embodiments can be configured using the techniques disclosed herein, in a wide variety of different applications.

It should also be understood that the disclosed software product usage evaluation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for evaluating software product usage may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments.

Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as reinforcement learning-based process 200, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based software product usage evaluation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. These platforms may also be used to implement at least portions of other information processing systems in other embodiments.

FIG. 4 shows an example processing platform comprising cloud infrastructure 400. The cloud infrastructure 400 comprises a combination of physical and virtual processing resources that may be utilized to implement at least a portion of an information processing system. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide software product usage evaluation functionality of the type described above for one or more processes running on a given one of the VMs. For example, each of the VMs can implement software product usage evaluation control logic for providing recommendations for changing the state of the monitored software product for one or more processes running on that particular VM.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can provide software product usage evaluation functionality of the type described above for one or more processes running on different ones of the containers. For example, a container host device supporting multiple containers of one or more container sets can implement one or more instances of software product usage evaluation control logic for providing recommendations for changing the state of the monitored software product.

As is apparent from the above, one or more of the processing modules or other components of RL module 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises at least a portion of the given system and includes a plurality of processing devices, denoted 502-1, 502-2, 502-3, . . . 502-K, which communicate with one another over a network 504. The network 504 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 502-1 in the processing platform 500 comprises a processor 510 coupled to a memory 512. The processor 510 may comprise a microprocessor, a microcontroller, an application specific integrated circuit (ASIC), a field programmable gate array (FPGA) or other type of processing circuitry, as well as portions or combinations of such circuitry elements, and the memory 512, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and the given system may include additional or alternative processing platforms, as well as numerous distinct processing platforms in any combination, with each such platform comprising one or more computers, storage devices or other processing devices.

Multiple elements of an information processing system may be collectively implemented on a common processing platform of the type shown in FIG. 4 or 5, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining a plurality of key performance indicators indicating usage of a software product by a user of an organization;
   determining, by at least one software-based agent using at least one processing device, a set of metrics for a predefined time window, the set of metrics comprising:
   (i) one or more of a mean and a median of one or more of the obtained key performance indicators;
   (ii) an amount of time that the software product was active on a display of the user; and
   (iii) an amount of interactions by the user with a user interface in the predefined time window; and
   applying, by the at least one software-based agent using the at least one processing device, a reinforcement learning process comprising:
      evaluating, using at least one neural network, a plurality of possible login states of the software product based at least in part on the set of metrics for the predefined time window, wherein the evaluating comprises observing the plurality of possible login states, including a current state comprising a current login state of the software product, and obtaining an expected utility score for changing from the current login state of the software product to a different login state of the software product based at least in part on a comparison of the plurality of key performance indicators to a corresponding set of predefined thresholds, wherein the set of predefined thresholds are defined for a plurality of users of the organization;
      determining whether to change from the current login state of the software product to the different login state of the software product based on the expected utility score;
      triggering the change to the different login state based on a result of said determining;
      prompting the user to provide feedback corresponding to the change;
      in response to obtaining negative feedback, from the user, corresponding to the change, adjusting at least one of the predefined thresholds in the set of predefined thresholds based at least in part on the negative feedback; and
      applying the adjusted at least one predefined threshold for the user for determining an adjusted expected utility score, wherein the adjusted at least one predefined threshold is further applied to one or more additional users of the plurality of users of the organization for determining respective expected utility scores for the one or more additional users;

wherein the method is performed by at least one processing device comprising a processor coupled to a memory.

2. The method of claim 1, wherein the plurality of key performance indicators indicating usage by the user of the software product comprise utilization indicators for one or more of processing resources, memory resources, network resources and input/output activity.

3. The method of claim 1, wherein the plurality of possible login states of the software product comprises a logged-in state, a logged-out state, and a state in which a potentially inactive user is prompted before logging out the potentially inactive user.

4. The method of claim 1, wherein the expected utility score further comprises a positive reward if the user does not reconnect to the software product after the user is logged out from the software product based on the determining whether to change from the current login state of the software product and a negative reward if the user reconnects to the software product within a predefined time interval after the user was logged out from the software product based on the determining whether to change from the current login state of the software product.

5. The method of claim 4, wherein at least one of: the positive reward and the negative reward is weighted based at least in part on a demand for licenses of the software product from a floating license pool.

6. The method of claim 1, wherein the evaluating further comprises determining if a given session of the software product is active based on the comparison of the plurality of key performance indicators for the predefined time window to the corresponding predefined threshold.

7. The method of claim 1, wherein the negative feedback from the user indicates that the change from the current login state of the software product to the different login state of the software product was an incorrect action.

8. The method of claim 1, further comprising selecting between a permanent user license and a floating user license for the user based on the evaluating.

9. The method of claim 1, wherein the user of the organization is assigned at least a first license of the software product, and wherein at least one of the one or more additional users of the organization is assigned at least a second license of the software product.

10. A computer program product, comprising a non-transitory machine-readable storage medium having encoded therein executable code of one or more software programs, wherein the one or more software programs when executed by at least one processing device perform the following steps:

obtaining a plurality of key performance indicators indicating usage of a software product by a user of an organization;

determining, by at least one software-based agent using the at least one processing device, a set of metrics for a predefined time window, the set of metrics comprising:
(i) one or more of a mean and a median of one or more of the obtained key performance indicators;
(ii) an amount of time that the software product was active on a display of the user; and
(iii) an amount of interactions by the user with a user interface in the predefined time window; and applying, by the at least one software-based agent using the at least one processing device, a reinforcement learning process comprising:
evaluating, using at least one neural network, a plurality of possible login states of the software product based at least in part on the set of metrics for the predefined time window, wherein the evaluating comprises observing the plurality of possible login states, including a current state comprising a current login state of the software product, and obtaining an expected utility score for changing from the current login state of the software product to a different login state of the software product based at least in part on a comparison of the plurality of key performance indicators to a corresponding set of predefined thresholds, wherein the set of predefined thresholds are defined for a plurality of users of the organization;
determining whether to change from the current login state of the software product to the different login state of the software product based on the expected utility score;
triggering the change to the different login state based on a result of said determining;
prompting the user to provide feedback corresponding to the change;
in response to obtaining negative feedback, from the user, corresponding to the change, adjusting at least one of the predefined thresholds in the set of predefined thresholds based at least in part on the negative feedback; and
applying the adjusted at least one predefined threshold for the user for determining an adjusted expected utility score, wherein the adjusted at least one predefined threshold is further applied to one or more additional users of the plurality of users of the organization for determining respective expected utility scores for the one or more additional users.

11. The computer program product of claim 10, wherein the expected utility score further comprises a positive reward if the user does not reconnect to the software product after the user is logged out from the software product based on the determining whether to change from the current login state of the software product and a negative reward if the user reconnects to the software product within a predefined time interval after the user was logged out from the software product based on the determining whether to change from the current login state of the software product.

12. The computer program product of claim 10, wherein the evaluating further comprises determining if a given session of the software product is active based on the comparison of the plurality of key performance indicators for the predefined time window to the corresponding predefined threshold.

13. The computer program product of claim 10, wherein the negative feedback from the user indicates that the change from the current login state of the software product to the different login state of the software product was an incorrect action.

14. The computer program product of claim 10, further comprising selecting between a permanent user license and a floating user license for the user based on the evaluating.

15. The computer program product of claim 10, wherein at least one of:
the plurality of key performance indicators indicating usage by the user of the software product comprise utilization indicators for one or more of processing resources, memory resources, network resources and input/output activity; and the plurality of possible login states of the software product comprises a logged-in state, a logged-out state, and a state in which a potentially inactive user is prompted before logging out the potentially inactive user.

16. An apparatus, comprising:

a memory; and at least one processing device, coupled to the memory, operative to implement the following steps:

obtaining a plurality of key performance indicators indicating usage of a software product by a user of an organization;

determining, by at least one software-based agent using the at least one processing device, a set of metrics for a predefined time window, the set of metrics comprising:

(i) one or more of a mean and a median of one or more of the obtained key performance indicators;

(ii) an amount of time that the software product was active on a display of the user; and (iii) an amount of interactions by the user with a user interface in the predefined time window; and applying, by the at least one software-based agent using the at least one processing device, a reinforcement learning process comprising:

evaluating, using at least one neural network, a plurality of possible login states of the software product based at least in part on the set of metrics for the predefined time window, wherein the evaluating comprises observing the plurality of possible login states, including a current state comprising a current login state of the software product, and obtaining an expected utility score for changing from the current login state of the software product to a different login state of the software product based at least in part on a comparison of the plurality of key performance indicators to a corresponding set of predefined thresholds, wherein the set of predefined thresholds are defined for a plurality of users of the organization;

determining whether to change from the current login state of the software product to the different login state of the software product based on the expected utility score;

triggering the change to the different login state based on a result of said determining;

prompting the user to provide feedback corresponding to the change;

in response to obtaining negative feedback, from the user, corresponding to the change, adjusting at least one of the predefined thresholds in the set of predefined thresholds based at least in part on the negative feedback; and applying the adjusted at least one predefined threshold for the user for determining an adjusted expected utility score, wherein the adjusted at least one predefined threshold is further applied to one or more additional users of the plurality of users of the organization for determining respective expected utility scores for the one or more additional users.

17. The apparatus of claim 16, wherein the expected utility score further comprises a positive reward if the user does not reconnect to the software product after the user is logged out from the software product based on the determining whether to change from the current login state of the software product and a negative reward if the user reconnects to the software product within a predefined time interval after the user was logged out from the software product based on the determining whether to change from the current login state of the software product.

18. The apparatus of claim 16, wherein the evaluating further comprises determining if a given session of the software product is active based on the comparison of the plurality of key performance indicators for the predefined time window to the corresponding predefined threshold.

19. The apparatus of claim 16, wherein the negative feedback from the user indicates that the change from the current login state of the software product to the different login state of the software product was an incorrect action.

20. The apparatus of claim 16, further comprising selecting between a permanent user license and a floating user license for the user based on the evaluating.

* * * * *